(12) United States Patent
Steiner et al.

(10) Patent No.: US 6,605,229 B2
(45) Date of Patent: Aug. 12, 2003

(54) PROCESS FOR PRODUCING ANTIREFLECTION COATINGS

(75) Inventors: Ullrich Steiner, Constance (DE); Stefan Walheim, Allensbach (DE); Erik Schäffer, Constance (DE); Stefan Eggert, Allensbach (DE); Jürgen Mlynek, Radolfzell (DE)

(73) Assignee: Universitat Konstanz, Constance (DE)

( * ) Notice: Subject to any disclaimer, the term of this patent is extended or adjusted under 35 U.S.C. 154(b) by 232 days.

(21) Appl. No.: 09/739,245

(22) Filed: Dec. 19, 2000

(65) Prior Publication Data

US 2001/0024684 A1 Sep. 27, 2001

Related U.S. Application Data

(63) Continuation of application No. PCT/EP99/04491, filed on Jun. 29, 1999.

(30) Foreign Application Priority Data

Jun. 30, 1998 (DE) .......................................... 198 29 172

(51) Int. Cl.[7] .............................. C08J 3/02; G02B 1/11; C03C 17/32; B05D 3/10; B05D 5/06; B05D 7/26; B05D 1/36

(52) U.S. Cl. .............................. 216/24; 216/41; 216/49; 216/56; 427/248.1; 427/255.37; 427/243; 427/162; 427/407.1; 427/340; 521/64

(58) Field of Search .............................. 216/24, 41, 49, 216/56; 521/61, 64; 427/248.1, 255.7, 255.37, 162, 407.1, 337, 340, 243

(56) References Cited

U.S. PATENT DOCUMENTS

| | | | |
|---|---|---|---|
| 4,271,210 A | | 6/1981 | Yoldas ........................ 427/169 |
| 4,273,826 A | * | 6/1981 | McCollister et al. ..... 428/310.5 |
| 4,830,879 A | | 5/1989 | Debsikdar .................... 427/162 |
| 5,858,457 A | * | 1/1999 | Brinker et al. ............... 427/162 |
| 6,177,131 B1 | * | 1/2001 | Glaubitt et al. .............. 427/162 |
| 6,271,273 B1 | * | 8/2001 | You et al. ....................... 521/61 |
| 6,391,932 B1 | * | 5/2002 | Gore et al. ..................... 521/61 |
| 2002/0065331 A1 | * | 5/2002 | Zampini et al. ............... 521/60 |

FOREIGN PATENT DOCUMENTS

| | | |
|---|---|---|
| EP | 0 775 669 A2 | 5/1997 |
| EP | 0 778 476 A2 | 6/1997 |

OTHER PUBLICATIONS

Walheim, S. et al, Macromolecules "Structure Formation via Polymer Demixing in Spin–Cast Films" 30 (17) 4995–5003, 1997.*

Stefan Walheim, Erik Schäffer, Jürgen Mlynek, and Ullrich Steiner, "*Nanophase–Separated Polymer Films as HighPerformance Antireflection Coatings,*" Science, Jan. 22, 1999, vol. 283, No. 5401, pp. 520–522.

Martin Böltau, Stefan Walheim, Jürgen Mlynek, George Krausch and Ullrich Steiner, "*Surface–induced structure formation of polymer blends on patterned substrates,*" Nature, Feb. 26, 1998, vol. 391, No. 6670, pp. 877–879.

* cited by examiner

*Primary Examiner*—Anita Alanko
(74) *Attorney, Agent, or Firm*—Burns, Doane, Swecker & Mathis, L.L.P.

(57) ABSTRACT

The invention relates to a method for producing an element comprising a substrate and at least one anti-reflection coating with pores. The dimensions of the anti-reflection coating are below the wavelength of visible light or the neighboring spectral ranges. The invention also relates to an element produced according to this method with at least one anti-reflection coating, for example optical lenses, mirrors or other optical components. The optical anti-reflection coating of these elements is essentially improved.

12 Claims, 2 Drawing Sheets

PROCESS FOR PRODUCING ANTIREFLECTION COATINGS

Figure 1:
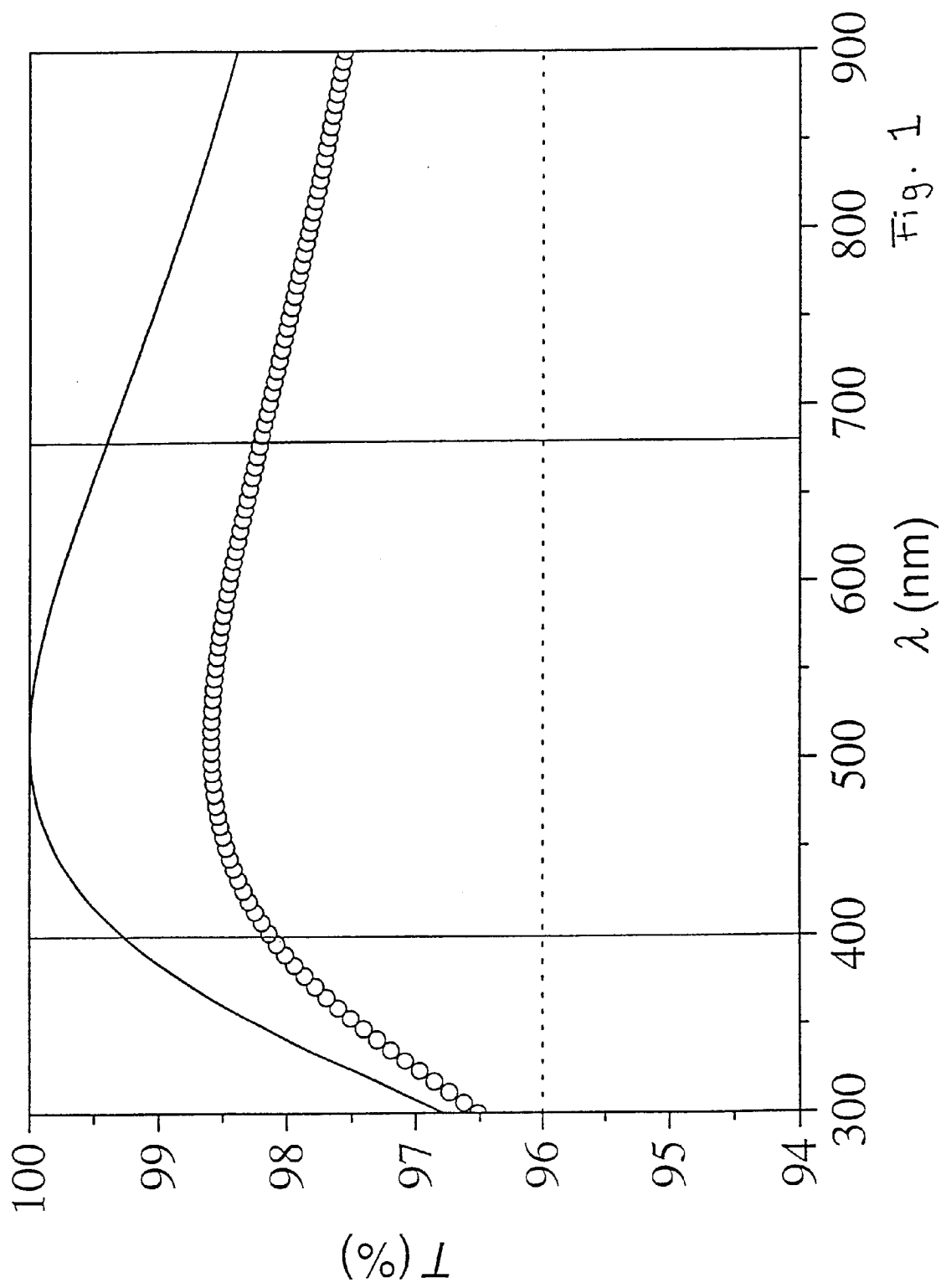

This application is a continuation of International Application No. PCT/EP99/04491 filed on Jun. 29, 1999, which designates the United States of America and was not published by the International Bureau in English on Jan. 6, 2000 and claims benefit of German Application 198 29 172.8 filed on Jun. 30, 1998.

The present invention relates to a process for producing an element comprising a substrate and at least one antireflection coating having pores, the dimensions of the antireflection coating being below the wavelength of visible light or the neighboring spectral ranges, and also an element produced according to this process having at least one antireflection coating, in particular optical lenses, mirrors or other optical components, such elements having an essentially improved optical antireflection coating.

The use of thin coatings for the antireflection coating of optical components is well-known. To reduce the reflected light at the interface of two optical media having different refractive indices, an optical coating whose refractive index is between that of the two optical media is applied to this interface.

It is further known that this antireflection coating can be improved by using several coatings instead of one coating and alternating coatings having high and low refractive indices. For example, an antireflection coating having three layers reduces the reflectivity of a glass-air interface from 4.3% of the total intensity to less than 1% above the total visible spectrum. Optical antireflection coatings are in particular important for lens systems having several air-glass transitions, since the reflection losses add up at each interface.

Calculating the reflectivity of the interface between two media having the refractive indices $n_0$ and $n_1$ allows one to determine the optical properties of an antireflection coating. A coating whose refractive index equals the root of the product of $n_1 \times n_0$ is optimum. For monochromatic light the reflectivity drops to 0 when the optical thickness of the coating is one-fourth the wavelength of the radiated light. For air and glass having $n_0=1$ and $n_1=1.52$, for example, the optimum refractive index of an antireflection coating is 1.23. However, the magnesium fluoride material frequently used for antireflection coatings has a refractive index of 1.38 and thus affects a reduction in the reflectivity at the glass-air interface by merely 1.3–2%. Materials having refractive indices lower than 1.3 in the visible wavelength range or in the neighboring infrared or ultraviolet ranges are unknown.

Applying an antireflection coating optimally reduces the reflectivity of the interface at the wavelength corresponding to one-fourth the optical thickness of the antireflection coating. Other wavelengths produce a higher reflectivity of the incident light. The reflectivity can be reduced uniformly in a broader wavelength range with the use of several antireflection coatings. In this case the optical properties of a series of antireflection coatings can also be determined via calculations. Several coatings, each of whose optical thickness equals one-fourth a so-called reference wavelength, are optimum. The refractive index of multicoating systems should ideally vary progressively between the refractive indices of the two media. For a glass-air interface this is not currently feasible with known media, since materials having refractive indices below 1.3 are not available.

A more recent innovation to the described technology consists of the use of so-called nanoporous materials. Materials having pores or air pockets whose dimensions are below the wavelength of visible light have an effective refractive index indicated by the average of the refractive index of the material and that of air. By varying the number of pores per volume and/or by varying the total percent by volume of pores, the refractive index can thus be set continuously by the refractive index of the substrate at a refractive index that is approximately 1. At this time two processes of the prior art which utilize this more recent innovation are known, namely a process that uses the sol-gel method, and a so-called embossing process. However, both processes have the decisive drawback that producing coatings having the desired properties is very expensive and moreover permits only the production of single coatings.

Thus, the problem underlying the present invention is to provide a process which is as simple, fast and affordable as possible for producing such elements comprising a substrate and at least one reflection-reducing coating, such as for example optical lenses, mirrors and other optical components, so that such elements have an essentially improved optical antireflection coating. A further problem of the present invention is to provide an element which in the case of a substrate-(e.g. glass)-air interface has a refractive index below 1.3.

These problems are solved by the embodiments characterized in the claims. In particular, there is provided a process for producing an element comprising a substrate and at least one antireflection coating having pores, the dimensions of the antireflection coating being below the wavelength of visible light or neighboring spectral ranges, comprising the steps preparing a substrate, applying a solution of at least two mutually incompatible polymers which are dissolved in a common solvent in such a manner that a common intermixed phase is produced, to a substrate, phase separation on its surface producing a coating having essentially laterally alternating polymer phases, and exposing this coating to another solvent so that at least one polymer remains undissolved.

When the solution of at least two mutually incompatible polymers is applied in accordance with the process of the present invention, a phase separation takes place in a two-component or multicomponent ("incompatible") mixture of macromolecular substances which are essentially immiscible, i.e. incompatible. Macromolecular substances suitable for this process are in particular polymers or oligomers, hereafter referred to collectively as polymers. Fundamentally, no restrictions of any kind are placed on the polymers that can be used in the scope of the process in accordance with the present invention, except that in the polymer combinations thus utilized the polymers used are essentially not mutually miscible, i.e. incompatible. Using known polymers in the polymer combinations or mixtures such as e.g. polystyrene, polymethyl methacrylate, polymethacrylate, polyacrylate, polyvinyl pyridine or polyvinyl chloride, all of which have refractive indices around 1.5, antireflection coatings having refractive indices below 1.3, for example even below 1.2, can be produced in accordance with the process of the present invention. Examples of mutually incompatible polymers that can be used are polystyrene and polymethyl methacrylate or polystyrene and polyvinyl chloride. The refractive index of the antireflection coating is the root of the product of the refractive index of the optical substrate and of the neighboring medium.

The process in accordance with the present invention makes it possible to obtain elements of, for example, glass, Plexiglas and polycarbonate having a refractive index less than 1.3 in the case when the neighboring medium is air. For antireflection coatings which consist of several layers or coatings, if one or more layers having a refractive index greater than 1.3 are present, one or more of the additional coatings must have a refractive index less than 1.2 or less than 1.1. If fluorinated polymers, such as e.g. DuPont's commercially available Teflon AF, having a refractive index of approximately 1.3 are used, antireflection coatings having refractive indices below 1.1 are obtainable according to the process in accordance with the present invention.

The selected polymers are dissolved in a substance that acts as a solvent for all components, such as for example toluene, benzene, tetrahydrofuran, ethanol, acetone and methanol, in such a manner that a common intermixed phase is produced. A coating or film is then produced from this solution on a suitable substrate via spin coating, dip coating, spray coating or other type of application. Assuming that the selected polymers are essentially not mutually miscible, the phase separation occurs while the coating is forming.

The coating produced in such a manner, which has for example a thickness from 50 to 500 nm, preferably 50 to 300 nm, contains after the production two or more phases which are usually present in a lateral arrangement. To obtain an antireflection coating, in an additional step a selective solvent which dissolves only one of the polymers used is used to remove the phase that consists for the most part of this polymer. For a multicomponent mixture this step can be repeated several times as needed. By varying the quantity ratio of the components which are dissolved or broken up in the additional step of the process in accordance with the invention, the effective refractive index of the antireflection layer can be set; i.e., the mixture ratio of the polymers is set as a function of the desired refractive index of the antireflection coating.

Such a separation is known in principle from Walheim et al., Macromolecules, volume 30, pp. 4995–5003 (1997), which describes the separation behavior of a mixture of polystyrene and polymethyl methacrylate from a solvent during the formation of the coating. The separation processes thus described can be regarded as a physical basis for producing antireflection coatings in accordance with the process of the invention in question. However, the dimension of the formed structures lies in the range from 1 to 6 $\mu$m; i.e., they are approximately ten times greater than the optical wavelength and are therefore basically not suitable for the antireflection coating of optical lenses, mirrors et al. Optical components coated in this manner actually have a dull appearance, since radiated light is scattered on the produced separation structures.

The optical antireflection coating in accordance with the present invention can be brought about via one or more of the above-mentioned nanoporous polymer coatings produced in accordance with the process of the present invention. In one embodiment of the process in accordance with the invention, the optical antireflection coating is brought about via a nanoporous structure inside the substrate, which is produced using the nanoporous polymer coatings as produced above via, for example, an etching process, the nanoporous polymer coatings formed via the process in accordance with the invention acting as a mask or stencil. Also, when these coatings are produced the dimension of the pores in the phase morphology can be set to be below the wavelength of visible light by choosing suitable parameters.

The antireflection coating formed by the process in accordance with the invention can be arranged, for example, as a single or multiple coating. In a preferred embodiment the at least one antireflection coating can be constructed as an antireflection gradient coating by exposing the coating to a selective solvent only briefly so that no polymer component is completely removed. Such an antireflection gradient coating is preferably constructed in such a manner that the percent by volume of pores or air pockets formed in the coating is a function of the distance from the coating surface, so that the coating has a gradient of the refractive index, so that the refractive index gradually changes from the refractive index of the first medium to that of the second medium. Such a gradient is typically characterized in that the transition from the value of the optical substrate to the neighboring medium is continuous. For an air-glass interface the gradient progresses between values of the refractive index from 1.0 to 1.5. However, gradients having in part such a progression are also possible.

The element obtainable via the process in accordance with the invention can be, for example, an optical lens or a mirror.

Figure 2:
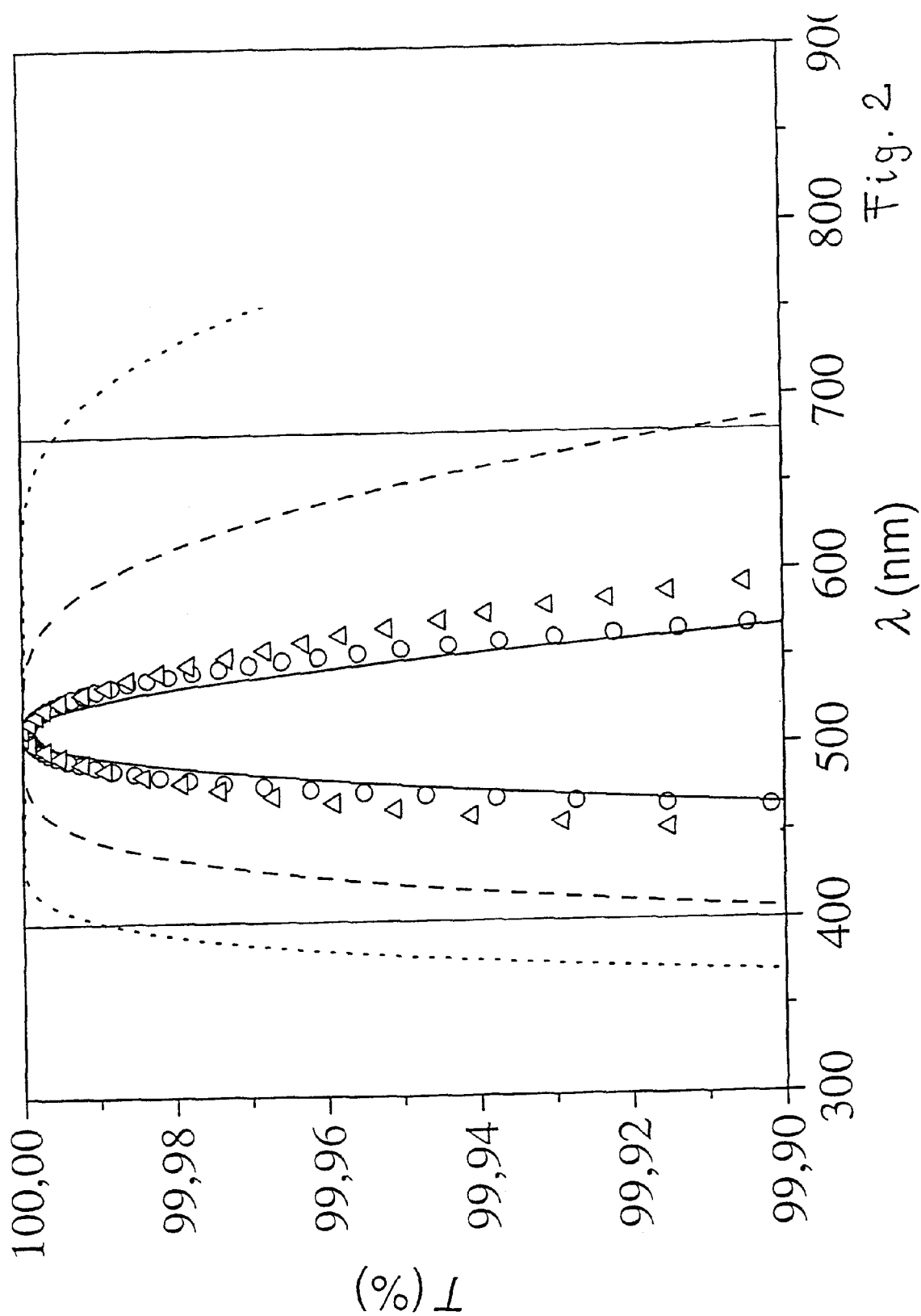

FIGS. 1 and 2 show a comparison of the calculated optical transmissions of nanoporous polymer coatings to conventional antireflection coatings.

In FIG. 1 a nanoporous single coating having a refractive index n=1.225 is compared to a conventional coating of magnesium fluoride. For this purpose the calculated transmission of an interface between air $n_0=1$ and glass $n_1=1.5$ is plotted as a function of the wavelength of the radiated light. The round symbols correspond to an antireflection coating of magnesium fluoride, the solid line to a polymer coating in accordance with the invention having n=1.225. For comparison the dotted line demonstrates the reflectivity of an uncoated glass surface. The optical thickness of the examined coatings is one-fourth the reference wavelength of 510 nm. In FIG. 1 it can be seen that a polymer coating in accordance with the invention vis-a-vis the conventional coating has an essentially increased transmission from 98 to 98.5% up to 99.5 to 100% throughout the entire visible spectrum. FIG. 2 compares conventional multicoatings to nanoporous single and multiple coatings. For this purpose the calculated transmission of an interface between air $n_0=1$ and glass $n_1=1.5$ is likewise plotted as a function of the wavelength of the radiated light. It is evident that even a single coating in accordance with the invention (solid line) has antireflection properties comparable to a triple coating of $MgF_2$, $Nd_2O_3$ and $ThO_2$ (round symbols), one of the conventional antireflection multicoatings. The dashed line corresponds to a nanoporous polymer double coating having refractive indices of n=1.107 and 1.355 and the dotted line to a nanoporous polymer triple coating with n=1.060, 1.234 and 1.426. The symbols correspond to conventional triple coatings with n=1.38, 2.02 and 1.80 (round symbols) and n=1.38, 2.20 and 1.70 (triangles). The optical thickness of the examined coatings is one-fourth the reference wavelength of 510 nm. The optical thickness is half the reference wavelength only in the case of the coating with n=2.20 (triangles). FIG. 2 clearly shows that a polymer double coating in accordance with the invention reduces the reflection in the entire visible wavelength range to under 0.1%, a polymer triple coating to under even 0.01%. The reflection values of double and triple coatings in accordance with the invention are thus several orders of magnitude below those of known coatings.

According to the process in accordance with the invention, the polymer coating(s) can be produced directly on the substrate to be coated, e.g. an optical lens, a mirror et al. In another embodiment in accordance with the invention, each of the described steps can be carried out on a carrier substrate, from which the coatings are then detached and transferred to the actual substrate. In another embodiment at least two coatings can be produced on different surfaces, and the second coating, and if necessary all additional coatings, can subsequently be detached from their respective substrates and then superimposed on the first coating. In another embodiment a first coating can be produced, a second coating can subsequently be applied directly to the first coating, and then in the second coating at least one additional polymer can be dissolved in a solvent which dissolves none of the polymers in the first coating; i.e., the multiple coating produced first is subsequently exposed to a solvent which dissolves only one of the polymers (or more, but not all in the case where several polymers are used).

The invention is hereafter elucidated in more detail by means of preferred embodiments, but is not limited to them.

1. Producing a single coating whose thickness corresponds to one-fourth of a reference wavelength of visible light Two or more mutually incompatible macromolecular substances (polymers) are dissolved in a suitable solvent which dissolves all polymers used. A coating is produced in such a manner that size of the phase-separated domains that arise when the coating is produced is below the reference wavelength. The dimension of these phase-separated domains can be controlled in the scope of the spin coating step by specific setting of a few parameters, such as in particular the molecular weight of the polymers used, their chain length, the choice of solvent and the solubility of the polymers associated therewith, the acceleration and the rotational speed of the lacquer centrifuge and the boiling point of the solvent. In an additional step this coating is then exposed to a solvent which selectively dissolves only one of the polymers (or more, but not all in the case where several polymers are used). If this coating consists of more than two different polymers, this step can in certain cases be carried out repeatedly, if necessary with several different solvents.

2. Producing multicoatings by superimposing single coatings

A first polymer coating is applied directly to the surface to be reflection-reduced as in the first embodiment, but without being exposed to a solvent in the second step. Additional coatings are correspondingly produced separately on other substrates, the mixture ratio of the polymers, which is typically in the range from 1:10 to 10:1, being chosen so that the antireflection coatings ultimately produced via the process in accordance with the invention have the desired refractive index.

The coatings are detached from their respective substrates and applied to the first, second etc. coating. The multicoating thus produced is subsequently exposed to a solvent which selectively dissolves at least one of the polymers (or more, but not all in the case where several polymers are used). If the multicoating consists of more than two different polymers, in certain cases this step can be carried out repeatedly, if necessary with several different solvents.

3. Producing multicoatings via sequential application of single coatings

A first polymer coating is applied directly to the surface to be reflection-reduced as in the first embodiment, but without being exposed to a solvent in a second step. For a second coating two or more polymers are dissolved in a solvent which does not dissolve at least one of the polymers in the first subjacent coating. In other words, at least one of the polymer components can be dissolved out of the first coating. The second coating is applied directly to the first. This process can be carried out repeatedly, provided one bears in mind that the solvent of the coating to be prepared may not dissolve the subjacent coating. As in the first two embodiments, the multicoating is exposed to a selective solvent which dissolves only one of the polymers (or more, but not all in the case where several polymers are used). If necessary, this step can be repeated several times, if necessary with different solvents.

4. Producing an antireflection multicoating having a gradient in the refractive index normal to the coating surface A coating is first produced as in the first embodiment. However, in contrast to the first embodiment this coating is not exposed to a selective solvent until one of the components has been completely removed, but only for a shorter time span. This results in the percent by volume of the dissolved-out pores being a function of the distance from the coating surface. This coating produced in such a manner has a refractive index which gradually changes from the refractive index of the first medium to that of the second medium.

5. Nanoporous coatings as etching masks

A nanoporous coating is produced, for example, as in the first embodiment. The surface thus coated is exposed to an etching solution (e.g. hydrofluoric acid) which etches the optical substrate (e.g. glass) or a previously applied coating. The etching solution etches the substrate or the coating only at those sites which are not at all or only barely covered by the polymer. Accordingly, pores or recesses having a suitable or corresponding depth are etched into the substrate or coating. The etching time determines the thickness of the etched coating; i.e., it must be chosen so that the pore depth corresponds to one-fourth the reference wavelength. After the surface is removed from the etching solution, the polymer coating can be removed, if necessary using a suitable solvent.

Accordingly, in this embodiment the nanoporous structure of the first-produced and ultimately removed polymer coating is transferred to the substrate or coating. The polymer coating functions as a stencil or mask.

The application of a nanoporous polymer coating and the subsequent etching of the substrate can each be repeated several times.

6. Combining the process with a sol-gel procedure

A single or multiple coating is produced according to one of the above-described embodiments 1 to 4. The coating is subsequently exposed to a solution containing the so-called precursor molecules, for example metal alkoxides such as aluminum-sec.-butoxide or (3-glycidyloxypropyl) trimethoxysilane. These precursor molecules can subsequently be converted in a sol-gel procedure to a solid, as a rule a porous solid. This can be achieved by a chemical reaction which is induced either chemically, photochemically or thermally (e.g. via heating).

The solution of precursor molecules is chosen so that it preferably can diffuse into only one of the polymer phases (but also into more, but not into all in the case where several polymers are used) or so that it becomes attached to the surface or interface. The sol-gel procedure known in the prior art is subsequently started and carried out, which separates out the precursor molecules. If necessary, all polymers are then removed. A nanoporous coating whose pores are smaller than the wavelength of visible light remains on the surface of the substrate.

An especially advantageous arrangement of this embodiment consists of adding suitable precursor molecules to the solvent from which the coating is produced, the precursor molecules being converted in a sol-gel procedure to a solid, as a rule a porous solid.

In this example of embodiment the polymer coating also functions once more as a stencil or mask.

7. Nanoporous coatings as stencils for evaporation coating procedures

A single or multiple coating is produced according to one of the above-described embodiments 1 to 4 in such a manner that the pores are interconnected from the air up to the surface of the substrate. This can be achieved once again, for example, by exposing the coated substrate briefly to an etching process. Examples of etching processes include reactive ion etching processes, plasma etching processes and wet etching processes. The coating thus obtained is then vapor-plated or sputtered-on with a material, such as e.g. magnesium fluoride, silicon dioxide etc., in such a manner that the pores are filled. The remaining polymer is removed. The coating thus produced consists of an inorganic material and has pores whose dimensions are below the wavelength of visible light.

The invention is hereafter elucidated in more detail by means of a typical example of embodiment, but is not limited to it.

In one typical example of embodiment polystyrene (PS) and polymethyl methacrylate (PMMA), having molecular weights of approximately 10 kg/mol (i.e. a molecular weight of approximately 10,000 each) were used. PS and PMMA were dissolved in the mixture ratio 70:30 in tetrahydrofuran (2 wt. % polymer). A microscope slide of white flint was used as an example of a substrate. A polymer coating was applied to both sides of the slide using the lacquer centrifuge process at a lacquer centrifuge rotational speed of 1300 rpm. The slide was subsequently exposed to cyclohexane as solvent for 1 minute, which dissolved PS but not PMMA. The result of these procedural steps was a slide that was reflection-reduced on both sides, both antireflection coatings consisting of a 106 nm thick PMMA film having 100 nm pores. The refractive index of these coatings was 1.225.

In another example of embodiment PMMA was replaced with polyvinyl chloride (PVC). The refractive index, the coating thickness and the pore diameter had the same values cited in the previous example of embodiment.

What we claim is:

1. Process for producing an element comprising a substrate and at least one antireflection coating having pores, the dimensions of the antireflection coating being below the wavelength of visible light or neighboring spectral regions, comprising the steps preparing said substrate, applying a solution of at least two mutually incompatible polymers which are dissolved in a common solvent in such a manner that a common intermixed phase is produced, to said substrate, phase separation on its surface producing a coating having essentially laterally alternating polymer phases, and exposing this coating to another solvent so that at least one polymer remains undissolved to obtain said antireflection coating having pores.

2. Process according to claim 1, in which the antireflection coating is first produced on a carrier substrate from which it is subsequently detached and then transferred to the substrate to be coated.

3. Process according to claim 1, the mixture ratio of the polymers being set as a function of the desired refractive index of the antireflection coating.

4. Process according to claim 1, in which at least two coatings are produced on different surfaces and the second coating, and if necessary all additional coatings, are subsequently detached from their respective substrates and then superimposed on the first coating.

5. Process according to claim 1, in which a first coating is produced, a second coating is subsequently applied directly to the first coating and the multicoating thus produced is subsequently exposed to a solvent which selectively dissolves at least one of the polymers.

6. Process according to claim 5, in which this process is repeated several times in such a manner that the solvent of the coating to be produced does not dissolve at least one of the polymers of the subjacent coating(s).

7. Process according to claim 1, in which the coating is exposed to a selective solvent only briefly so that no polymer components are completely removed to obtain an antireflection gradient coating.

8. Process according to claim 7, the percent by volume of the dissolved-out pores being a function of the distance from the coating surface, so that the coating produced in such a manner has a gradient of the refractive index, so that the refractive index gradually changes from the refractive index of the first medium to that of the second medium.

9. Process according to claim 1, in which a single or multiple coating is first produced, one or more phases are subsequently dissolved out by suitable solvents and then exposed to an etching solution for so long a time that pores having a suitable depth are produced on the substrate at the sites not covered by the polymer(s).

10. Process according to claim 1, in which a single or multiple coating is first produced, one or more phases are subsequently dissolved out by suitable solvents, then exposed to a suitable solution of precursor molecules, and a sol-gel procedure is subsequently carried out with the precursor molecules being separated out.

11. Process according to claim 1, in which a single or multiple coating is first produced, suitable precursor molecules having already been added to one or more solutions, a sol-gel procedure is then carried out with the precursor molecules being separated out, and one or more of the polymer phases are subsequently removed.

12. Process according to claim 1, in which a single or multiple coating is first produced, one or more phases are subsequently dissolved out by suitable solvents and the coating thus obtained is then vapor-plated with a material in such a manner that the pores present in the coating are filled.

* * * * *